(12) United States Patent
Chawki et al.

(10) Patent No.: US 10,193,768 B2
(45) Date of Patent: Jan. 29, 2019

(54) SYSTEM FOR GENERATING A VIRTUALIZED NETWORK FUNCTION

(71) Applicant: Orange, Paris (FR)

(72) Inventors: Jamil Chawki, Lannion (FR); René Robert, Rospez (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 15/538,864

(22) PCT Filed: Dec. 21, 2015

(86) PCT No.: PCT/FR2015/053695
§ 371 (c)(1),
(2) Date: Jun. 22, 2017

(87) PCT Pub. No.: WO2016/102871
PCT Pub. Date: Jun. 30, 2016

(65) Prior Publication Data
US 2017/0359231 A1    Dec. 14, 2017

(30) Foreign Application Priority Data

Dec. 23, 2014 (FR) ...................................... 14 63260

(51) Int. Cl.
*H04L 12/24* (2006.01)
*G06F 9/455* (2018.01)

(52) U.S. Cl.
CPC ...... *H04L 41/5051* (2013.01); *G06F 9/45558* (2013.01); *H04L 41/0806* (2013.01); *G06F 2009/45595* (2013.01)

(58) Field of Classification Search
CPC ......... G06F 2009/45595; G06F 9/5077; G06F 2212/152; G06F 9/45558; H04L 41/5051; H04L 41/0806
See application file for complete search history.

(56) References Cited

U.S. PATENT DOCUMENTS 9,384,028 B1 *   7/2016   Felstaine ................. H04L 67/02
9,716,626 B1 *   7/2017   Herzog .................. H04L 41/082
9,760,923 B1 *   9/2017   Felstaine ............ G06Q 30/0603
9,774,541 B1 *   9/2017   Herzog .................. H04L 47/78
(Continued)

OTHER PUBLICATIONS

International Search Report and Written Opinion dated May 17, 2016 for Application No. PCT/FR2015/053695.
(Continued)

*Primary Examiner* — Devan Sandiford
(74) *Attorney, Agent, or Firm* — Knobbe, Martens, Olson & Bear, LLP

(57) ABSTRACT

A device for configuring a virtualized network function, configured for use in a virtualized communication network, is disclosed. The device is configured to receive a request to configure the virtualized network function. The device is also configured to obtain at least one parameter for implementing an elementary component of the virtualized network function in a virtualized communication network, to be added to a basic virtualized network function. The device is also configured to compose the virtualized network function from at least one elementary component and from the parameter for implementing the at least one obtained elementary component.

12 Claims, 1 Drawing Sheet

(56) References Cited

U.S. PATENT DOCUMENTS

| | | | |
|---|---|---|---|
| 2011/0209147 A1* | 8/2011 | Box | G06F 9/5077 718/1 |
| 2012/0096077 A1* | 4/2012 | Weerts | G06F 9/5077 709/203 |
| 2014/0201374 A1 | 7/2014 | Ashwood-Smith et al. | |
| 2014/0317261 A1 | 10/2014 | Shatzkamer et al. | |
| 2014/0317293 A1* | 10/2014 | Shatzkamer | G06F 9/455 709/226 |
| 2015/0180730 A1* | 6/2015 | Felstaine | H04L 41/022 709/225 |
| 2015/0295849 A1* | 10/2015 | Xia | H04L 47/782 370/235 |
| 2016/0043944 A1* | 2/2016 | Felstaine | H04L 45/70 370/389 |
| 2016/0057234 A1* | 2/2016 | Parikh | H04L 67/16 709/226 |
| 2016/0085576 A1* | 3/2016 | Chastain | G06F 9/50 718/1 |
| 2016/0105332 A1* | 4/2016 | Xiang | H04L 41/5045 709/226 |
| 2016/0124781 A1* | 5/2016 | Chastain | H04L 41/0893 719/313 |
| 2016/0127201 A1* | 5/2016 | Qian | H04L 41/5054 709/226 |
| 2016/0127478 A1* | 5/2016 | Chastain | H04L 67/16 709/223 |
| 2016/0134472 A1* | 5/2016 | Guan | H04L 41/0806 709/222 |
| 2016/0149774 A1* | 5/2016 | Chastain | H04L 43/028 370/241 |
| 2016/0212016 A1* | 7/2016 | Vrzic | H04L 41/5051 |
| 2016/0299830 A1* | 10/2016 | Chastain | G06F 9/45558 |
| 2016/0337175 A1* | 11/2016 | Rao | H04L 49/25 |
| 2017/0048200 A1* | 2/2017 | Chastain | H04L 63/0272 |
| 2017/0078216 A1* | 3/2017 | Adolph | H04L 12/4641 |
| 2017/0104609 A1* | 4/2017 | McNamee | H04L 12/4641 |
| 2017/0139727 A1* | 5/2017 | Combellas | G06F 8/65 |
| 2017/0149733 A1* | 5/2017 | Chastain | H04L 61/2575 |
| 2017/0171068 A1* | 6/2017 | Morper | H04L 45/66 |
| 2017/0257276 A1* | 9/2017 | Chou | H04L 41/0896 |
| 2017/0257801 A1* | 9/2017 | Toth | H04W 64/003 |

OTHER PUBLICATIONS

ETSI, Network Functions Virtualisation (NFV); Architectural Framework, ETSI GS NFV 002, V1.1.1 (Oct. 2013), Retrieved from the Internet: URL:http://www.etsi.org/deliver/etsi gs/nfv/001099/002/01.01.01 60/gs nfv002v010101p.pdf.

ETSI, Network Functions Virtualisation (NFV); Virtualisation Requirements, ETSI GS NFV 004, V1.1.1 (Oct. 2013), Retrieved from the Internet: URL:http://www.etsi.org/deliver/etsi gs\NFV\001099\004\01.01.01 60\gs NFV004v010101p.pdf.

\* cited by examiner

SYSTEM FOR GENERATING A VIRTUALIZED NETWORK FUNCTION

RELATED APPLICATIONS

This application is the U.S. National Phase of Application No. PCT/FR2015/053695 entitled "SYSTEM FOR GENERATING A VIRTUALISED NETWORK FUNCTION" filed Dec. 21, 2015, which designated the United States, and which claims the benefit of French Application No. 1463260 filed Dec. 23, 2014.

The invention is in the field of telecommunication networks, and more particularly relates to a system for generating a virtualized network function for a virtualized communication network.

The standards body ETSI (European Telecommunications Standards Institute) launched a project called NFV (Network Functions Virtualization) at the beginning of 2013 to establish, between the experts in the telecommunications and information technology sectors, the first specifications in the field of virtualization (i.e. dematerialization) of the functions used in telecommunications networks, hereafter referred to as network functions. These network functions refer to, for example, the functions implemented by a core network, a gateway, a firewall, etc. A virtualized network function is defined more particularly on the basis of elementary components corresponding, for example, to software modules implementing an elementary function of this virtualized network function. The virtualization of these functions is carried out in particular by so-called cloud computing systems, which implement and host these functions on virtual machines accessible, for example, via a network application. These virtual machines use remote hardware computing-resources and networks (e.g. network connectivity, computing power, storage spaces, servers, applications, etc.), managed by the cloud computing system, and shared between the various clients thereof depending on the respective needs thereof. This allows clients to scalably access these resources without having to administer the often-complex underlying infrastructure for managing these resources.

The ETSI specifications document GS NFV 001 v.1.1.1, published in October 2013, entitled "Network Functions Virtualization (NFV); Use Cases", presents several cases of use of the virtualization of network functions. This document describes in a very general way the virtualization of network functions in various contexts (virtualization of a mobile network, of a base station, of a content distribution network, etc.). The virtualized network architectures described in this manner suffer nevertheless from some disadvantages. The client services of a virtualized network infrastructure are particularly limited by the number of virtualized network functions available thereto through the network infrastructure. The network functions implemented are in particular fixed without it being possible to intervene on the elementary components thereof. Additionally, offering a wide range of virtualized network functions is only permitted at the cost of increasing the catalog of virtualized network functions, which catalog is provided by the virtualized network infrastructure in which they are implemented. This results particularly in a more complex catalog, with an increased risk of selecting a virtualized network function that is unsuited to the service requested by a customer.

One of the aims of the invention is to overcome shortcomings/disadvantages of the prior art and/or to bring about improvements thereto.

According to a first aspect, the invention relates to a device for configuring a virtualized network function, intended to be implemented in a virtualized communication network. The device comprises:

a receiving module, arranged to receive a request for configuration of the virtualized network function;

an obtaining module, arranged to obtain at least one parameter for implementation in a virtualized communication network of an elementary component of the virtualized network function, to be added to a basic virtualized network function;

a configuration module, arranged to compose the virtualized network function from at least one elementary component and from the parameter for implementing the at least one obtained elementary component.

The configuration device makes it possible, on request of a requesting entity, to define virtualized network functions from elementary components (called VNFC meaning "Virtual Networking Function Component" in English) corresponding, for example, to software modules implementing an elementary function of a virtualized network function. Such a virtualized network function is, for example, a "router" function, and two elementary components of this virtualized network function are, for example, a module for supporting the IPv6 (Internet Protocol version 6) protocol and a module for supporting the BGP (Border Gateway Protocol) protocol.

The device allows for advantageously combining elementary components with a basic network function in order to produce a virtualized network function that meets particular requirements of a client entity of a virtualized network infrastructure where this function will be implemented.

Thanks to the device, it is thus possible to configure virtualized network functions according to customized criteria with great flexibility. The elementary components can be easily implemented, for example, by one or more virtual machines created for this purpose within a virtualized network infrastructure, depending on the implementation parameters associated with this component.

Such a device for configuring a virtualized network function also makes it possible to dispense with the need to have an excessive catalog of virtualized network functions made available by a virtualized network infrastructure, for example for client entities of this network infrastructure. A virtualized network function not present in such a catalog can indeed advantageously be configured by the configuration device from the basic network function and from elementary components of such a function. This also results in savings in the storage resources associated with such a catalog, since the virtualized network functions can indeed be obtained by composing the basic network function and elementary components. This makes it easier to select a virtualized network function within the catalog. Likewise, a simplified catalog route is also possible. Such a device thus makes it possible to simplify the offer of client services which is available via the virtualized network infrastructure.

In addition, the configuration device also makes it possible to facilitate maintenance of the virtualized network functions, the latter being, for example, easily reconfigurable when an elementary component of a virtualized network function is updated, without having to replace the virtualized network function as a whole. Such updating may, for example, result from an improvement or from a correction of an elementary component.

According to a particular feature, the configuration request comprises a list of elementary components for said virtualized network function.

Since the elementary components required, for example, by a third-party entity for the virtualized network function are directly provided in the provision request, the configuration of the virtualized network function by the configuration device is accelerated.

According to a particular feature, the configuration device further comprises a module for checking compatibility of a first elementary component with at least a second elementary component in order to compose the virtualized network function, the configuration module being activated only when the first and second elementary components are verified as being compatible with one another.

Checking a compatibility between elementary components of a virtualized network function makes it possible to obtain a valid configuration for the virtualized network function to be configured. It is thus possible to restrict the choice of the elementary components for a virtualized network function to the only components that, combined together, make it possible to perform the virtualized network function. In addition, this checking makes it possible to guarantee a high level of performance of the virtualized network function, and to avoid a misuse of elementary components by a particular virtualized network function.

According to a particular feature, the configuration device further comprises a sending/receiving module, arranged to send, to a generation device, a command for generating the virtualized network function, from the composed virtualized network function, in a format executable in the virtualized communication network.

Sending a generation command makes it possible to command a device to generate the virtualized network function resulting from the configuration of this function from elementary components. The configuration of a virtualized network function and the generation thereof are thus separated, which makes it easier to manage these two functions.

In addition, the generation of the virtualized network function is requested in a format executable in a particular virtualized communication network. The virtualized network function can thus be adapted to constraints particular to this virtualized communication network. The generation of the virtualized network function may in particular take into account constraints of performance, of usage, or even of desired levels of quality which relate to this virtualized communication network.

The generation of the virtualized network function in an executable form also makes it possible to reuse this function within the virtualized communication network without having to re-configure it. The function in the executable form thereof may in particular be stored in order to feed a catalog of customized virtualized network functions, meeting particular requirements of a client entity of the virtualized network infrastructure for which the function has been generated.

According to one particular feature, the configuration device further comprises a local database, arranged to store a virtualized network function generated by the generation device.

According to a second aspect, the invention relates to a system for generating a virtualized network function, comprising:

a database, arranged to store implementation parameters associated with elementary components of virtualized network functions, the parameters relating to an implementation of the components in at least one virtualized communication network;

a device for configuring a virtualized network function according to one of the particular features according to the first aspect, wherein the obtaining module is arranged to obtain the at least one implementation parameter from the database.

According to a particular feature, the generation system further comprises a device for generating a virtualized network function, the generation device comprising:

an obtaining module, arranged to obtain a data model of at least one elementary component of a virtualized network function from the database;

a sending/receiving module, arranged to receive a command for generating the virtualized network function, from a composed virtualized network function in a format executable in a virtualized communication network, and to send, to the configuration device, the generated virtualized network function;

a computing module, arranged to generate said virtualized network function in a format executable in a virtualized communication network, from at least one data model of at least one elementary component of the virtualized network function.

The advantages stated for any one of the features of the device for configuring a virtualized network function according to the first aspect can be transposed directly to the system for generating a virtualized network function according to the second aspect.

According to a third aspect, the invention relates to a method for configuring a virtualized network function, intended to be implemented in a virtualized communication network. The method comprises:

receiving a request for configuring the virtualized network function;

obtaining at least one parameter for implementation in a virtualized communication network of an elementary component of the virtualized network function, to be added to a basic virtualized network function;

composing the virtualized network function from at least one elementary component and from the parameter for implementing the at least one obtained elementary component.

According to a particular feature, the configuration request comprises a list of elementary components for the virtualized network function.

According to a particular feature, the configuration method further comprises a check for compatibility of a first elementary component with at least a second elementary component in order to compose the virtualized network function, the composition being implemented only when the first and second elementary components are verified as being compatible with one another.

According to a fourth aspect, the invention also relates to a program for a configuration device, comprising program code instructions for commanding the execution of the steps of the method described above, when said program is executed by said device and a recording medium that can be read by a configuration device on which a program for a configuration device is recorded.

The invention will be better understood with the aid of the following description of particular embodiments, with reference to the appended drawings in which.

Figure 1:
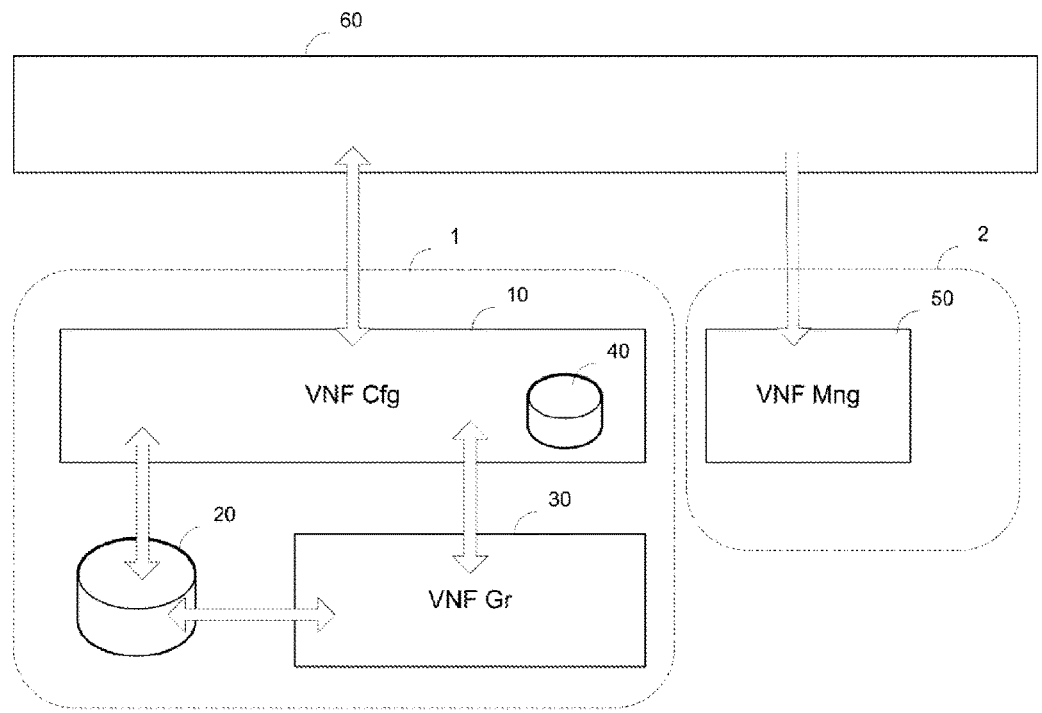
FIG. 1 shows a system for generating a virtualized network function, in the environment thereof, according to a particular embodiment.

FIG. 1 shows a system 1 for generating a virtualized network function in the environment thereof according to a particular embodiment. The system 1 comprises, in particular, a device for configuring a virtualized network function 10, a device for generating a virtualized network function 30 and a database 20 arranged to store elementary components of a virtualized network function and implementation parameters associated with these elementary components. The database 20 thus defines a catalog of elementary components and of virtualized network functions. The parameters are, for example, descriptors of virtualized network functions (in English "VNF descriptor" meaning "Virtual Network Function descriptor") as defined by ETSI. In particular, the object thereof is to specify the operational behavior of the virtualized network functions and the resources needed to deploy them (for example, number of virtual machines, memory, bandwidth, latency).

The system 1 makes it possible to configure and generate a virtualized network function from elementary components, which are stored in the database 20, and which are selected to compose this virtualized network function. This virtualized network function is moreover intended to be implemented in a virtualized communication network 2. The configuration and the generation of the virtualized network function are more precisely carried out on request of a requesting entity 60 with which the system 1 communicates. The requesting entity 60 is, for example, a portal proposing a man-machine interface to a user. The communication between the system 1 and the requesting entity 60 is, for example, carried out via the http (Hypertext Transfer Protocol) communication protocol. Once generated by the system 1, a virtualized network function is stored in a database 40 of the generation system 1. The system 1 then makes it possible to transmit the virtualized network function via the requesting entity 60 to a virtualized resource management device 50 (in English "VNF Manager" meaning "Virtual Network Function Manager") for the implementation thereof in the virtualized communication network 2.

The configuration and the generation of a virtualized network function by the system 1 will now be described. For this purpose, by way of example, a virtualized network function VNF1 is considered, which designates a routing function intended to be implemented in a communication network by a router.

In a particular embodiment, the requesting entity 60 sends a request to provide a virtualized network function to the configuration device 10 indicating that it requests the provision of the function VNF1 for an implementation of this function in the virtualized communication network 2.

In response to this request, the configuration device 10 queries the database 20 in order to obtain a list of elementary components for the function VNF1, then transmits this list to the requesting entity 60. This list includes, by way of example, the following elementary components C1, C2, C3 and C4: a module C1 for supporting the IPv4 (Internet Protocol version 4) protocol, a module C2 for supporting the IPv6 protocol, a module C3 for supporting the MPLS (Multiprotocol Label Switching) protocol, a module C4 for supporting the BGP protocol, and a basic virtualized network function VNF2 associated by default with a routing function. The various elementary components correspond, for this example, to modules for supporting protocols that are alternatives and/or complementary to those provided in the virtualized network function by default.

The requesting entity 60 verifies that the virtualized network function VNF2 associated with a routing function corresponds to the desired technical requirements for the requested function VNF1. By way of example, it is assumed in this embodiment that the requesting entity 60 requests a virtualized network function VNF1 that supports the IPv6 and BGP protocols, whereas these two protocols are not supported by the virtualized network function VNF2. Since the virtualized network function VNF2 does not correspond to the desired technical requirements for the virtualized network function VNF1, the requesting entity 60 selects the elementary components C2 and C4 corresponding to the modules for supporting the IPv6 protocol and for supporting the BGP protocol, respectively, then sends a request for configuring the virtualized network function VNF1 from these two elementary components to the configuration device 10.

The configuration device 10 receives this configuration request, then queries the database 20 in order to obtain the implementation parameters for the elementary components C2 and C4. The implementation parameters indicate the technical features necessary for the implementation of the elementary component concerned (e.g. computing capacity, amount of memory, virtual machine number, etc.). These implementation parameters may also depend on a geographical location or on a particular virtualized communication network where the elementary components will be implemented. In the present embodiment, the implementation parameters relate more specifically to an implementation in the virtualized communication network 2. The elementary components and the associated implementation parameters are, for example, described in the TOSCA (Topology and Orchestration Specification for Cloud Applications) language defined by the OASIS (Organization for the Advancement of Structured Information Standards) consortium.

Once the parameters for implementation of the elementary components C2 and C4 are obtained by the configuration device 10, the latter has a complete description of each of the components C2 and C4 composing the virtualized network function VNF1, for implementing the latter in the virtualized communication network 2. The configuration device 10 then sends a request for generating the virtualized network function VNF1 to the generation device 30.

The generation device 30 then queries the database 20 in order to obtain a data model for each elementary component C2 and C4, and a data model for the virtualized network function VNF2 associated by default with a routing function. These data models are, by way of example, shown using the YANG data model language defined in the IETF document RFC 6020 "YANG—A Data Modeling Language for the Network Configuration Protocol (NETCONF)". The generation device 30 then aggregates the various models obtained into a single data model, representing the virtualized network function VNF1 composed of the elementary components C2, C4 and of the virtualized network function VNF2. The resulting virtualized network function VNF1 corresponds to a router function that supports the IPv6 and BGP protocols.

The generation device 30 generates, from the data model of the virtualized network function VNF1 and from the parameters for implementing the components C2 and C4 of the function VNF1, the virtualized network function VNF1 in a format that is executable and allows it to be deployed (for example OVF (Open Virtualization Format) format) in the virtualized communication network 2. It is also emphasized that, in a particular embodiment, the generation of the virtualized network function by the generation device 30 can take into account constraints of performance, of usage, or even of desired levels of quality which relate to this virtualized communication network. The generation device 30 will then be provided with the communication interfaces necessary for obtaining the constraint information from third-party devices.

The generation device 30 then sends the virtualized network function VNF1 generated in the executable form thereof to the configuration device 10. In a particular embodiment, the latter stores the function VNF1 in a local database 40. The function VNF1 can thus be reused by the configuration device 10 during a next request for a virtualized network function equivalent to the function VNF1 without the need to generate it again.

Finally, the configuration device transmits the virtualized network function VNF1 to the requesting entity 60. The latter deploys it in the virtualized communication network 2 via a virtualized resource management device 50.

In another embodiment, the configuration device further performs a check for compatibility between the elementary component C2 and the elementary component C4, the actual configuration of the virtualized network function VNF1 being carried out only if the elementary components C2 and C4 are verified as being compatible with one another.

In another embodiment, the generation device 30 directly transmits the virtualized network function VNF1 to the virtualized communication network 2.

In another embodiment, the requesting entity 60 obtains the elementary components available for the virtualized network function VNF1 by directly querying the database 20 without going through the configuration device 10. It then directly transmits the elementary components selected for the virtualized network function VNF1 in the request for providing a virtualized network function addressed to the configuration device 10. A check for compatibility between elementary components can moreover advantageously be implemented by the database 20 before transmission of the elementary components to the configuration device 10. By way of example, if the virtualized network function VNF1 corresponds to a router with a low routing capacity, the database 20 will not transmit any elementary component corresponding to a module for supporting the MPLS protocol. Likewise, for a virtualized network function VNF1 corresponding to a router, the features of which are intended for a use in access, the database 20 will not transmit elementary components corresponding to a module for supporting the BGP protocol. Such filtering of the elementary components by the database 20 can also take into account policies for provision of the virtualized network functions by a third-party entity.

The present embodiment has been described with a limited number of elementary components. However, there are no limitations on the number of elementary components that can be used in the composition of a virtualized network function. Moreover, in another embodiment, an elementary component can also refer to a module with particular technical features rather than a module performing a particular function (for example, elementary components referring to entities for managing a transfer plane or a control plane of a router function having various capacities per second of request processing).

Similarly, there is no limitation on the communication protocol used between the requesting entity 60 and the configuration device 10. The communication interface between the requesting entity 60 and the configuration device 10 can be easily adapted to any type of communication protocol operating on a client-server model.

It is further emphasized that the system 1 has been illustrated previously for implementing a virtualized network function representing a router, but that there is no limitation on the type of virtualized network function that can be generated by the system 1. By way of example, the system 1 can also be implemented to generate a virtualized network function representing a P-GW (Packet Data Network Gateway) gateway composed of elementary components corresponding to, respectively, the PCEF (Policy and Charging Rules Function) and TDF (Traffic Detection Function) functions as defined by the 3GPP standards organization, or a content delivery network (for example, CDN (Content Delivery Network) network).

Figure 2:
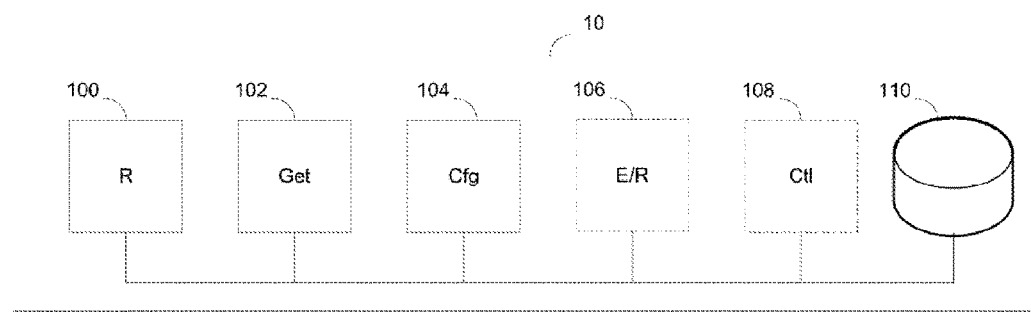
FIG. 2 shows a device for configuring a virtualized network function according to a particular embodiment.

FIG. 2 shows a device 10 for configuring a virtualized network function according to a particular embodiment. The configuration device 10 comprises:

a receiving module 100, arranged to receive a request for configuration of the virtualized network function;

an obtaining module 102, arranged to obtain at least one parameter for implementation in a virtualized communication network 2 of an elementary component of the virtualized network function, to be added to a basic virtualized network function;

a configuration module 104, arranged to compose said virtualized network function from at least one elementary component and from the parameter for implementing the at least one obtained elementary component.

In another embodiment, the configuration request comprises a list of elementary components for the virtualized network function.

In another embodiment, the configuration device 10 also comprises a module 108 for checking compatibility of a first elementary component with at least a second component in order to compose said virtualized network function, the configuration module 104 being activated only when the first and second elementary component are verified as being compatible with one another.

In another embodiment, the configuration device 10 further comprises a sending/receiving module 106, arranged to send, to a generation device 30, a command for generating the virtualized network function, from the composed virtualized network function, in a format executable in the virtualized communication network 2.

In another embodiment, the configuration device 10 further comprises a local database 110, arranged to store a virtualized network function generated by a device 30 for generating a virtualized network function. The sending/receiving module 106 is, in this case, also arranged to receive a virtualized network function generated by a generation device 30.

Figure 3:
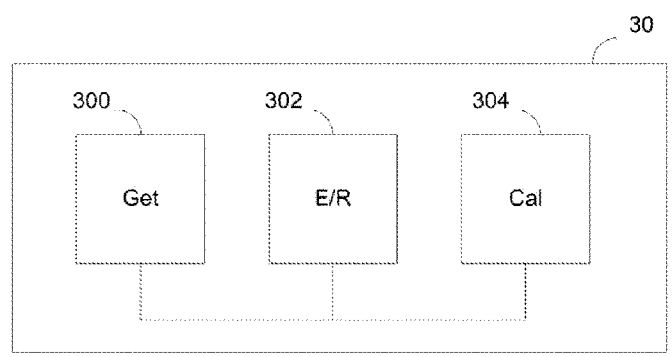
FIG. 3 shows a device for generating a virtualized network function according to a particular embodiment.

FIG. 3 shows a device 30 for generating a virtualized network function according to a particular embodiment. The generation device 30 comprises:

an obtaining module 300, arranged to obtain a data model of at least one elementary component of a virtualized network function;

a sending/receiving module 302, arranged to receive a command for generating the virtualized network function, from a composed virtualized network function, in a format executable in a virtualized communication network 2, and to send, to a configuration device 10, the generated virtualized network function;

a computing module 304, arranged to generate the virtualized network function in a format executable in a virtualized communication network 2, from at least one data model of at least one elementary component of the virtualized network function.

The invention is implemented by means of software and/or hardware components. From this perspective, the term "module" can correspond in this document equally to a software component, a hardware component or a set of hardware and/or software components, which can implement a function or a set of functions, as described above for the module in question.

A software component corresponds to one or more computer programs, one or more subprograms of a program, or more generally to any element of a program or software. Such a software component is stored in memory, then loaded and executed by a data processor of a physical entity and is capable of accessing the hardware resources of this physical entity (memories, recording media, communication bus, input/output electronic boards, user interfaces, etc.).

In the same manner, a hardware component corresponds to any element of a hardware assembly. It can be an optionally programmable hardware component, with or without an integrated processor for software execution. It is, for example, an integrated circuit, a chip card, an electronic board for executing a firmware, etc.

In a particular embodiment, the modules 100, 102, 104, 106 and 108 are arranged to implement the configuration method described above. These are preferably software modules comprising software instructions for executing those of the steps of the configuration method described above, which are implemented by a configuration device. The invention therefore also relates to:

a program for a configuration device, comprising program code instructions for commanding the execution of the steps of the configuration method previously described, when said program is executed by a configuration device;

a recording medium that can be read by a configuration device on which the program for a configuration device is recorded.

The software modules can be stored in or transmitted by a data medium. This can be a storage hardware medium, for example a CD-ROM, a magnetic diskette or a hard disk, or a transmission medium such as an electrical, optical or radio signal, or a telecommunication network.

The invention claimed is:

1. A device arranged to configure a virtualized network function, for use in a virtualized communication network, the device having a processor executing software to:
   receive a request for configuration of the virtualized network function;
   obtain at least one parameter for implementation in a virtualized communication network of an elementary component of the virtualized network function, the elementary component to be added to a basic virtualized network function; and
   compose the virtualized network function from the basic virtualized network function and the elementary component implemented from the at least one obtained parameter.

2. The device of claim 1, wherein the configuration request comprises a list of elementary components for the virtualized network function.

3. The device of claim 1, further configured to check compatibility of the elementary component with at least a second elementary component in order to compose the virtualized network function, the composition of the virtualized network function being carried out only when the elementary component and the second elementary components are verified as being compatible with one another.

4. The device of claim 1, further configured to send, to a generation device, a command for generating the virtualized network function from the composed virtualized network function in a format executable in the virtualized communication network.

5. The device of claim 4, further comprising a local database, arranged to store a virtualized network function generated by the generation device.

6. A system for generating a virtualized network function, the system comprising:
   a database, arranged to store implementation parameters associated with elementary components of virtualized network functions, the parameters relating to an implementation of the components in at least one virtualized communication network; and
   a device for configuring a virtualized network function, wherein the device configured to:
   receive a request for configuration of the virtualized network function;
   obtain from the database, at least one parameter for implementation in the virtualized communication network of an elementary component of the virtualized network function, the elementary component to be added to a basic virtualized network function; and
   compose the virtualized network function from the basic virtualized network function and the elementary component implemented from the at least one obtained parameter.

7. The system of claim 6, further comprising a device configured to generate a virtualized network function, the generation device configured to:
   obtain a data model of at least one elementary component of a virtualized network function from the database;
   receive a command for generating the virtualized network function, from a composed virtualized network function, in a format executable in a virtualized communication network, and to send, to the configuration device, the generated virtualized network function; and
   generate the virtualized network function in a format executable in a virtualized communication network, from at least one data model of at least one elementary component of the virtualized network function.

8. A method for configuring a virtualized network function, for use in a virtualized communication network, the method comprising:
   receiving a request for configuring the virtualized network function;
   obtaining at least one parameter for implementation in a virtualized communication network of an elementary component of the virtualized network function, the elementary component to be added to a basic virtualized network function; and
   compose the virtualized network function from the basic virtualized network function and the elementary component implemented from the at least one obtained parameter.

9. The method of claim 8, wherein the configuration request comprises a list of elementary components for the virtualized network function.

10. The method of claim 8, further comprising checking for compatibility of a first elementary component with at least a second elementary component in order to compose the virtualized network function, wherein composing the virtualized network function occurs only when the first and second elementary components are verified as being compatible with one another.

11. A configuration device, having stored thereon instructions which, when executed by a processor of the configuration device, cause the configuration device to perform a method of configuring a virtualized network function, for use in a virtualized communication network, the method comprising:

receiving a request for configuring the virtualized network function;

obtaining at least one parameter for implementation in a virtualized communication network of an elementary component of the virtualized network function, the elementary component to be added to a basic virtualized network function; and composing the virtualized network function from the basic virtualized network function and the elementary component implemented from the at least one obtained parameter.

12. A non-transitory computer readable medium having stored thereon instructions which, when executed by a processor, cause the processor to perform a method of configuring a virtualized network function, for use in a virtualized communication network, the method comprising:

receiving a request for configuring the virtualized network function;

obtaining at least one parameter for implementation in a virtualized communication network of an elementary component of the virtualized network function, the elementary component to be added to a basic virtualized network function; and composing the virtualized network function from the basic virtualized network function and the elementary component implemented from the at least one obtained parameter.

* * * * *